United States Patent
Kominami et al.

(10) Patent No.: US 7,642,732 B2
(45) Date of Patent: Jan. 5, 2010

(54) DIELECTRIC BARRIER DISCHARGE LAMP LIGHTING APPARATUS AND METHOD OF DETECTING THE NUMBER OF NORMALLY LIGHTING DIELECTRIC BARRIER DISCHARGE LAMPS

(75) Inventors: Satoshi Kominami, Osaka (JP); Toshiaki Kurachi, Kyoto (JP)

(73) Assignee: Panasonic Corporation, Osaka (JP)

( * ) Notice: Subject to any disclaimer, the term of this patent is extended or adjusted under 35 U.S.C. 154(b) by 223 days.

(21) Appl. No.: 11/913,123

(22) PCT Filed: Mar. 26, 2007

(86) PCT No.: PCT/JP2007/056200

§ 371 (c)(1),
(2), (4) Date: Oct. 30, 2007

(87) PCT Pub. No.: WO2007/125704

PCT Pub. Date: Nov. 8, 2007

(65) Prior Publication Data

US 2009/0066257 A1    Mar. 12, 2009

(30) Foreign Application Priority Data

Apr. 26, 2006  (JP)  .............................. 2006-121951

(51) Int. Cl.
 *G05F 1/00* (2006.01)
(52) U.S. Cl. .................. 315/307; 315/291; 315/247; 315/224; 315/312
(58) Field of Classification Search ............... 315/224, 315/225, 247, 246, 209 R, 274–280, 291, 315/297, 307–326
See application file for complete search history.

(56) References Cited

U.S. PATENT DOCUMENTS

| | | | | |
|---|---|---|---|---|
| 4,498,031 | A | * | 2/1985 | Stupp et al. .................. 315/307 |
| 2004/0100438 | A1 | | 5/2004 | Lee et al. |
| 2008/0088253 | A1 | * | 4/2008 | Bonigk ........................ 315/225 |

FOREIGN PATENT DOCUMENTS

| | | |
|---|---|---|
| JP | 10-123298 | 5/1998 |
| JP | 2003-347082 | 12/2003 |
| JP | 2004-311396 | 11/2004 |
| JP | 2004-342351 | 12/2004 |
| JP | 2005-174909 | 6/2005 |

(Continued)

OTHER PUBLICATIONS

English language Abstract of JP 2005-174909.

(Continued)

*Primary Examiner*—Tuyet Vo
(74) *Attorney, Agent, or Firm*—Greenblum & Bernstein P.L.C.

(57) ABSTRACT

A dielectric barrier discharge lamp lighting apparatus includes twenty-four dielectric barrier discharge lamps, and a ballast circuit for lighting the twenty-four dielectric barrier discharge lamps which includes a DC power supply, an inverter circuit, a step-up transformer, and a lighting lamp number detecting circuit. The lighting lamp number detecting circuit detects the number of normally lighting dielectric barrier discharge lamps based on a first peek appearing right after polarity change of an approximate rectangular wave provided from the step-up transformer. When the detected number is less than a predetermined value, the operation of the ballast circuit is controlled to be stopped.

5 Claims, 5 Drawing Sheets

FOREIGN PATENT DOCUMENTS

| | | |
|---|---|---|
| JP | 2006-012538 | 1/2006 |
| JP | 2006-012660 | 1/2006 |

OTHER PUBLICATIONS

English language Abstract of JP 2003-347082.
English language Abstract of JP 10-123298.
English language Abstract of JP 2004-311396.
English language Abstract of JP 2006-012660.
English language Abstract of JP 2006-012538.
English language Abstract of JP 2004-342351.

* cited by examiner

DIELECTRIC BARRIER DISCHARGE LAMP LIGHTING APPARATUS AND METHOD OF DETECTING THE NUMBER OF NORMALLY LIGHTING DIELECTRIC BARRIER DISCHARGE LAMPS

TECHNICAL FIELD

The present invention relates to a lighting apparatus for a discharge lamp having an external electrode operated with dielectric barrier discharge, and more particularly to a discharge lamp lighting apparatus which applies an approximate rectangular wave voltage to light a dielectric discharge lamp with a pulse current flowing when a value of the approximate rectangular wave voltage changes.

BACKGROUND ART

Recently, as backlight applications of liquid crystal displays and the like, studies are intensively concentrate on a rare gas discharge lamp having an external electrode operated with dielectric barrier discharge. This is because the rare gas discharge lamp dose not need mercury and light emission efficiency is not changed by change of mercury vapor pressure, and also because it is preferred from the environmental point of view. In lighting operation using dielectric barrier discharge, the dielectric layer is charged by application of a driving voltage, and discharge is induced by a high voltage generated when the driving voltage is inverted, and hence a rectangular wave voltage of high frequency is used as driving voltage.

Generally, a safety circuit in case of emergency is included in the lighting apparatus of almost all discharge lamps, not limited to dielectric barrier discharge lamps. This is intended to prevent inconvenience, or breakage of a ballast circuit due to continued application of a high voltage to a discharge lamp, or shortening of life due to abnormal high temperature, when the lamp fails to light due to leak of discharge tube of a discharge lamp.

An example of a safety circuit of a dielectric barrier discharge lamp lighting apparatus is disclosed in patent document 1.

FIG. 8A is a block diagram of a safety circuit of a conventional dielectric barrier discharge lamp lighting apparatus. In FIG. 8A, the dielectric barrier discharge lamp lighting apparatus includes a dielectric barrier discharge lamp 101, a direct-current power supply 102, an inverter circuit 103 for converting the direct-current voltage of the direct-current power supply 102 to an alternating-current voltage, a step-up transformer 104 for boosting the alternating-current voltage from the inverter circuit 103, a drive circuit 105 for driving switch elements included in the inverter circuit 103, a voltage detecting circuit 106 for detecting a waveform of the high voltage output from the step-up transformer 104, and a comparator 107 for comparing shape of the detected high voltage output waveform with shape of the voltage output waveform in a normal lighting mode.

The dielectric barrier discharge lamp 101 has a discharge tube of 150 mm in length and 3 mm in outside diameter which is filled with 13.3 kPa of xenon gas as discharge gas, and an internal electrode of Ni bar is sealed at one end of the discharge tube. As an external electrode, a 0.5 mm Ni conductor wire is wound around the discharge tube. The inner wall of the discharge tube is coated with phosphor prepared appropriately in RGB colors in order to obtain desired light. The direct-current power supply 102 is, for example, a battery or chopper type direct-current power supply for producing a direct-current voltage of 24 V. The inverter circuit 103 has, for example, a configuration of half bridge type, full bridge type, or push-pull type, and turns on or off the switch elements included in the inverter circuit 103 by a signal from the drive circuit 105 to convert the direct-current voltage from the direct-current power supply 102 to an approximate rectangular wave alternating-current of, for example, 20 kHz. The step-up transformer 104 boosts the approximate rectangular wave alternating-current voltage from the inverter circuit 103, and converts it into an approximate rectangular wave voltage including ringing of high voltage of, for example, 3 kVp-p. The output voltage from the step-up transformer 104 is applied between the internal electrode and external electrode of the dielectric barrier discharge lamp 101 through a lead wire. The drive circuit 105 is formed of an exclusive IC or microcomputer, and controls the entire ballast circuit. The voltage detecting circuit 106 which is composed of resistors and others divides the output voltage of the step-up transformer 104, and detects the waveform. The comparator 107 compares the voltage waveform detected by the voltage detecting circuit 106 with the reference waveform, and sends a signal for stopping the operation of the ballast circuit to the drive circuit 105 if the waveform is changed more than specified amount.

The operation of such conventional dielectric barrier discharge lamp lighting apparatus is explained. When the power supply (not shown) is turned on, an approximate rectangular wave voltage including high voltage ringing is generated from the step-up transformer 104. The rectangular wave voltage of high voltage applied between the internal electrode and external electrode of the dielectric barrier discharge lamp 101 generates discharge in the discharge tube. When the discharge starts, xenon gas generates ultraviolet ray of 172 nm by excimer light emission. The generated ultraviolet ray is converted into a visible light by the phosphor of the inner wall of the discharge tube to render the dielectric barrier discharge lamp 101 emit light. At this time, since the dielectric barrier discharge lamp 101 operates normally, the output voltage waveform from the step-up transformer 104 becomes as shown in FIG. 8B. The voltage detecting circuit 106 outputs a signal proportional to the voltage waveform shown in FIG. 8B to the comparator 107. The comparator 107 compares the signal from the voltage detecting circuit 106 with a predetermined reference waveform signal. When the comparator 107 judges that normal lighting is done, the ballast circuit continues to light the dielectric barrier discharge lamp 101 without outputting a signal to instruct stop of operation of the ballast circuit.

On the other hand, if there is a trouble such as leak in the dielectric barrier discharge lamp 101, the dielectric barrier discharge lamp 101 does not emit light. Then the output voltage waveform from the step-up transformer 104 becomes as shown in FIG. 8C. The voltage detecting circuit 106 outputs a signal proportional to the voltage waveform shown in FIG. 8C to the comparator 107. The comparator 107 judges that the output voltage waveform from the step-up transformer 104 is extremely different from the normal voltage waveform shown in FIG. 8B based on the signal from the voltage detecting circuit 106, and sends a signal for instructing stop of operation of the ballast circuit to the drive circuit 105. The drive circuit 105 stops the output signal to the inverter circuit 103 based on the signal from the comparator 107, thereby stopping the operation of the ballast circuit.

Generally, since in the dielectric barrier discharge lamp, load characteristic is of positive capacitive characteristic, plural lamps can be operated in parallel by one ballast circuit. By contrast, in other discharge lamps than the dielectric barrier discharge lamp, such as a heat cathode fluorescent lamp or HID lamp, usually, one ballast circuit is needed for each lamp. Accordingly, in the ballast circuit of other lamps than the dielectric barrier discharge lamp, it is relatively easy to detect abnormality of lamp by detection of lamp current or the like. In a dielectric barrier discharge lamp lighting apparatus disclosed in patent document 1, also, one ballast circuit lights one lamp and copes with trouble of one lamp.

Patent document 2 discloses an example of safety circuit for detecting lighting failure of one or several lamps when a plurality of dielectric barrier discharge lamps are lit in parallel by one ballast circuit. According to patent document 2, in a discharge lamp lighting system including a ballast circuit connected to a plurality of dielectric barrier discharge lamps (referred to as "EEFL lamps") of External Electrode Fluorescent Lamp type, a lighting sensor is provided in each one of the EEFL lamps, and an abnormal EEFL lamp is detected according to the signal from each lighting sensor operable to stop the operation of the ballast circuit.

Patent document 1: JP-A-2003-347082
Patent document 2: JP-A-2005-174909

DISCLOSURE OF INVENTION

Problem to be Solved by the Invention

Patent document 1 teaches comparison of voltage waveforms in the event of leak or other abnormality, but is silent for specific comparison method for coping with the case of a plurality of dielectric barrier discharge lamps being operated in parallel. Patent document 2 discloses a specific example of a safety circuit when a plurality of dielectric barrier discharge lamps are operated in parallel. However providing each lamp with a lighting sensor makes a structure complicated and leads to cost increase.

The invention is devised in the light of the background described above, and it is hence an object thereof to present a dielectric barrier discharge lamp lighting apparatus for lighting a plurality of dielectric barrier discharge lamps in parallel in a simple structure capable of counting the number of normally lighting lamps securely out of the plurality of dielectric barrier discharge lamps and stopping the operation of the ballast circuit when the number of normally lighting lamps becomes less than a specified number.

Means for Solving Problems

In a first aspect of the invention, a dielectric barrier discharge lamp lighting apparatus is provided. The apparatus includes a plurality of dielectric barrier discharge lamps filled with rare gas in a discharge tube and having at least one external electrode, a ballast circuit for applying an approximate rectangular wave voltage of high voltage to the plurality of dielectric barrier discharge lamps in parallel, and a lighting lamp number detecting circuit for detecting the number of normally lighting dielectric barrier discharge lamps on the basis of a first peak appearing right after polarity change of the approximate rectangular wave voltage. The ballast circuit stops its operation when the number of normally lighting dielectric barrier discharge lamps detected by the lighting lamp number detecting circuit becomes less than a specified number. According to this configuration, the number of normally lamps out of the plurality of dielectric barrier discharge lamps can be detected, and the operation of the ballast circuit can be stopped securely when the specified number of lamps is not lit.

Moreover, the apparatus may further include a display unit for displaying warning when at least one of the plurality of dielectric barrier discharge lamps fails to light. Hence the user of the dielectric barrier discharge lamp lighting apparatus can easily recognize that at least one of the plurality of dielectric barrier discharge lamps fails to light.

The dielectric barrier discharge lamps may contain xenon as rare gas. When the lamp includes xenon as rare gas, excellent ionization and excitation efficiency in discharge are achieved, and a light source of high luminance and high efficiency can be realized.

In a second aspect of the invention, provided is a method of detecting the number of normally lighting dielectric barrier discharge lamps in a lighting apparatus for lighting a plurality of dielectric barrier discharge lamps by applying an approximate rectangular wave voltage. The dielectric barrier discharge lamp is filled with rare gas in a discharge tube and has at least one external electrode. The method includes detecting an amplitude value of a first peak appearing right after polarity change of an approximate rectangular wave, and detecting the number of normally lighting dielectric barrier discharge lamps on the basis of the detected amplitude value of the first peak. By this method, the number of normally lit dielectric barrier discharge lamps can be securely detected.

EFFECTS OF THE INVENTION

According to the invention, in the dielectric barrier discharge lamp lighting apparatus which applies an approximate rectangular wave voltage of high frequency and high voltage to plurality of dielectric barrier discharge lamps each having at least one external electrode, detects the number of normally lighting dielectric barrier discharge lamps, and is operable to stop the operation of the ballast circuit when the detected number becomes smaller than a specified number. According to this arrangement, lamp failure can be detected and processed appropriately, and thus the invention is useful to a light source in various applications and brings about outstanding effects.

REFERENCE SIGNS

Figure 1:
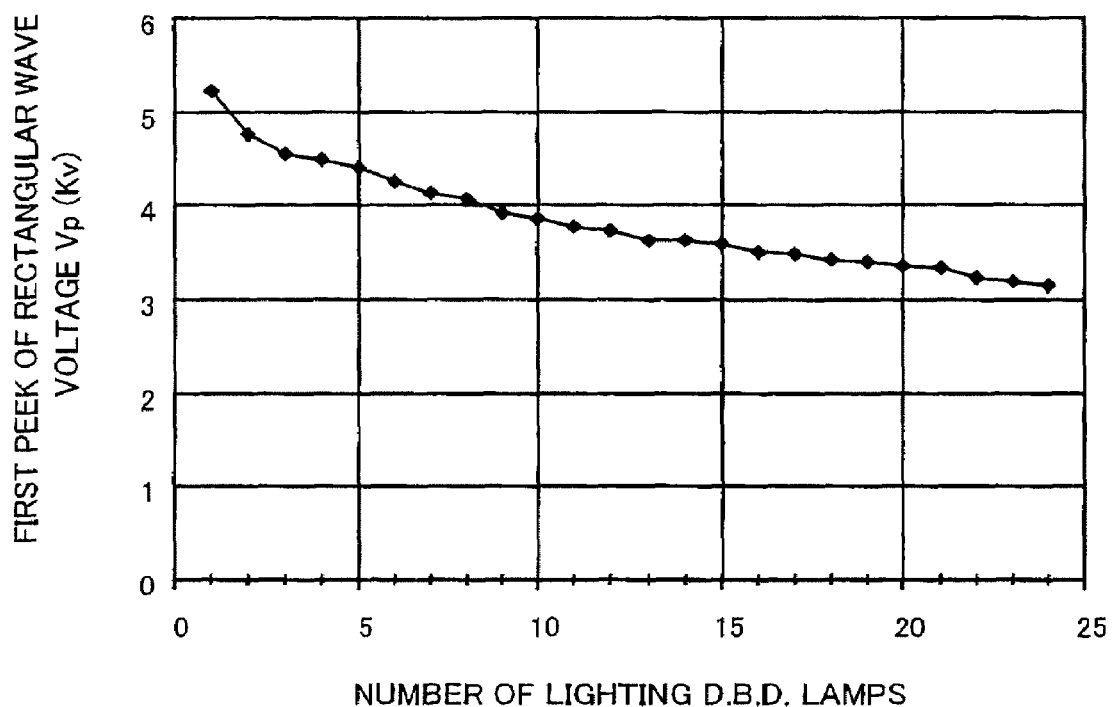
FIG. 1 is a diagram showing changes of a first peak value of a high voltage approximate rectangular wave voltage depending on the change in the number of lighting dielectric barrier discharge (D.B.D.) lamps.

1 Dielectric barrier discharge lamp (D.B.D. lamp)
2, 2b, 2c Ballast circuit
3 Direct-current power supply
4 Inverter circuit
5 Step-up transformer
6, 6b, 6c Lighting lamp number detecting circuit
7 Drive circuit
9, 15 DC (direct-current) power supply
8, 9 FET
10, 26 Control circuit
11, 14, 15, 29 Resistor
12 Capacitor
13 Diode
16 Discharge tube
17 Internal electrode
18 External electrode
19 Phosphor
22 Comparator
23 Reference power supply
27 Display unit
28 LED

BEST MODE FOR CARRYING OUT THE INVENTION

Preferred embodiments of the invention are described below with reference to the accompanying drawings.

Basic Principle

First, a basic principle is explained about the method of detecting the number of normally lighting dielectric barrier discharge lamps in the case of lighting a plurality of dielectric barrier discharge lamps in parallel.

FIG. 1 is a diagram of experimental determination of the relation between the number of normally lighting dielectric barrier discharge lamps during lighting a plurality of dielectric barrier discharge lamps in parallel, and the first peak value (a value of the peak appearing first) appearing right after polarity change of the high voltage approximate rectangular wave voltage applied from a ballast circuit to the plurality of dielectric barrier discharge lamps.

The dielectric barrier discharge lamp used in the experiment was a borosilicate glass discharge tube of 710 mm in length, 3 mm in outside diameter, and 2 mm in inside diameter, filled with 16 kPa of xenon gas, and internal electrodes were disposed at both ends of the discharge tube, and an external electrode was disposed at a position away from the discharge tube by 3 mm. The external electrode was an aluminum flat plate, and a common external electrode was provided for a plurality of dielectric barrier discharge lamps.

Figure 2:
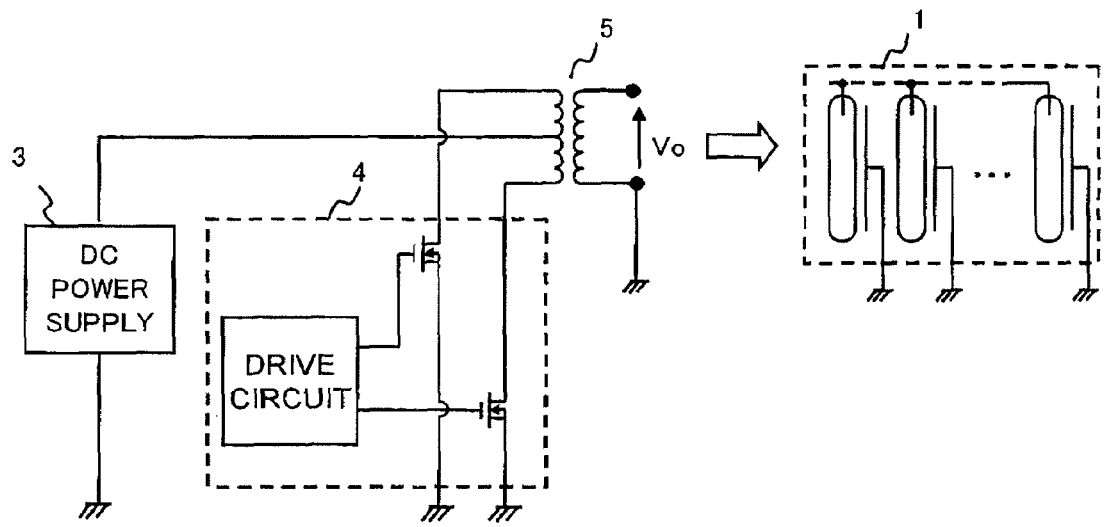
FIG. 2 is a circuit diagram of a circuit used for measurement of changes of a first peak value of a high voltage approximate rectangular wave voltage.

The ballast circuit was a push-pull type ballast circuit shown in FIG. 2, which converts a DC (direct current) voltage of 24V from the DC power supply 3 to an AC (alternate current) voltage of 20 kHz by the inverter circuit 4, and boosted the converted voltage to about 77 times voltage by the step-up transformer 5 to supply it to the dielectric barrier discharge lamp 1.

In the experiment, a total of twenty-four dielectric barrier discharge lamps were used, and were lit up in parallel by the ballast circuit shown in FIG. 2, and the number of normally lighting dielectric barrier discharge lamps was changed.

Figure 3A:
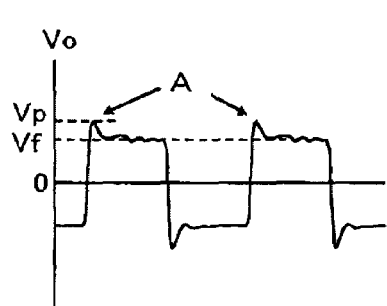
FIGS. 3A to 3C are diagrams showing changes of a high voltage approximate rectangular wave voltage depending on the change in the number of non-lighting dielectric barrier discharge lamps.
Figure 3B:
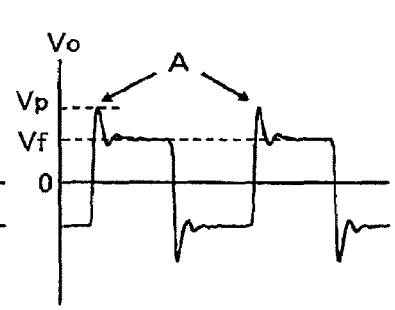
Figure 3C:
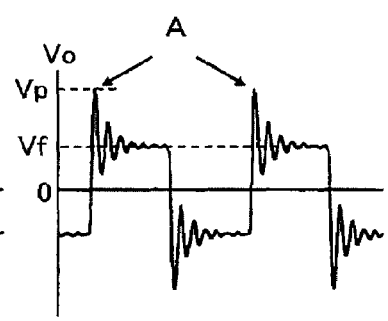

FIGS. 3A to 3C show an example of an output voltage waveform when lighting the dielectric barrier discharge lamps by the ballast circuit shown in FIG. 2, respectively. FIG. 3A shows an output voltage waveform when all of twenty-four dielectric barrier discharge lamps are lighting normally, FIG. 3B shows an output voltage waveform when 12 dielectric barrier discharge lamps are lighting normally. FIG. 3C shows an output voltage waveform when only one dielectric barrier discharge lamps is lighting normally. In FIGS. 3A to 3C, symbol "A" denotes the first peak appearing right after polarity change. The value of the first peak A is measured with respect to the grounding potential (0).

It is apparent from FIGS. 3A to 3C that a value Vp of the first peak A appearing right after polarity change is mostly proportional to the number of lighting dielectric barrier discharge lamps. That is, as the number of lighting dielectric barrier discharge lamps decreases, the first peak value Vp appearing right after polarity change increases. The inventors of the present invention have discovered the proportional relation between the first peak value Vp appearing right after polarity change and the number of lighting dielectric barrier discharge lamps. As known from FIGS. 3A to 3C, the stabilized voltage Vf of voltage waveform does not change significantly depending on the number of lighting lamps.

In other words, detection of the voltage change of the first peak value Vp appearing right after polarity change enables detection of the number of normally lighting dielectric barrier discharge lamps. This provides the function to stop the ballast circuit securely when a specified number of dielectric barrier discharge lamps fail to light.

It is estimated that the first peak value right after polarity change increases along with decrease in the number of normally lighting dielectric barrier discharge lamps because the capacity of dielectric barrier discharge lamp when lighting is different from that when not lighting.

Several specific embodiments of the invention achieved on the basis of the principle discovered by the inventors are described below with reference to the accompanying drawings.

Embodiment 1

Figure 4:
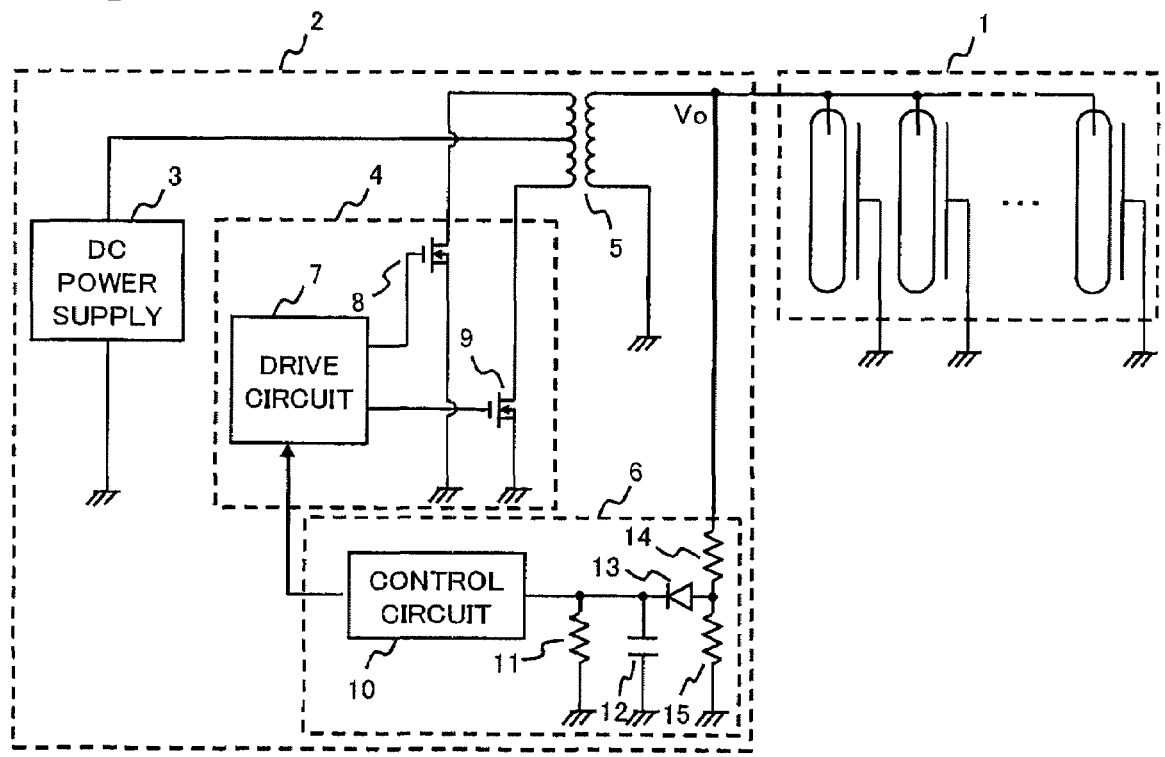
FIG. 4 is a diagram of configuration of a dielectric barrier discharge lamp lighting apparatus according to embodiment 1 of the invention.

FIG. 4 is a diagram of configuration of a dielectric barrier discharge lamp lighting apparatus according to embodiment 1 of the invention.

The dielectric barrier discharge lamp lighting apparatus according to embodiment 1 of the invention includes a plurality of (twenty-four in this example) dielectric barrier discharge lamps 1, and a ballast circuit 2 for lighting the plurality of dielectric barrier discharge lamps 1 in parallel.

Figure 5:
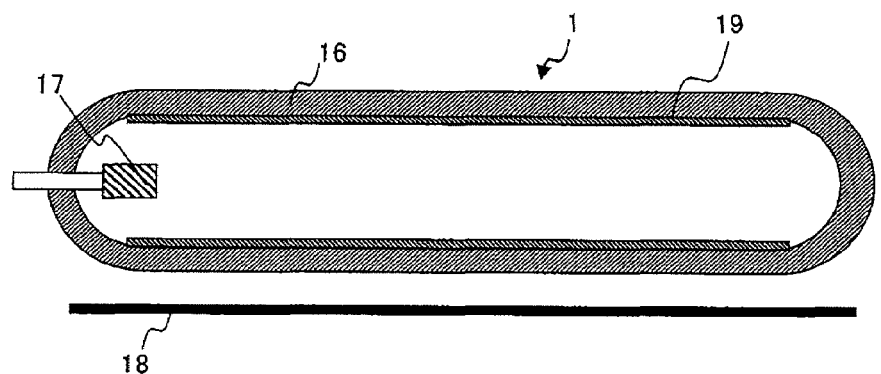
FIG. 5 is a diagram of structure of a dielectric barrier discharge lamp.

FIG. 5 shows a structure of the dielectric barrier discharge lamp 1. As shown in FIG. 5, the dielectric barrier discharge lamp 1 has a cylindrical discharge tube 16 formed of borosilicate glass having excellent in transmissivity in visible light region (380 nm to 770 nm), filled with a mixed gas mainly composed of xenon as discharge gas, with its sealing pressure, for example, of 20 kPa. Other gas components than xenon include helium, neon, argon, and krypton, and the mixing ratio is, for example, 6:4. The inner surface of the discharge tube 16 is coated with a phosphor 19. An internal electrode 17 made of nickel is disposed at one end of the discharge tube 16, and is electrically led out to outside of the discharge tube 16 by means of a lead. An external electrode 18 is disposed apart from the discharge tube 16, and the distance between the discharge tube 16 and external electrode 18 is fixed, for example, at 3 mm by means of a spacer (not shown). The spacer is formed of a white or transparent resin. The external electrode 18 is made of aluminum or other metal. The external electrode 18 may be provided individually for each of plural discharge tubes 16, or commonly utilized for the plural discharge tubes 16.

Returning to FIG. 4, the ballast circuit 2 is a push-pull type ballast circuit, including a DC power supply 3, an inverter circuit 4, a step-up transformer 5, and a lighting lamp number detecting circuit 6. FETs 8 and 9 included in the DC power supply 3 and inverter circuit 4 are connected to the primary winding of the step-up transformer 5.

A drive circuit 7 sends a gate signal to FETs 8 and 9 to turn on and off FETs 8 and 9 alternately. The drive circuit 7 may be achieved easily using commercial IC and the like.

The step-up transformer 5 converts the DC voltage from the DC power supply 3 into an approximate rectangular wave of high frequency and high voltage. That frequency depends on a frequency of the output signal of the drive circuit 7, and is, for example, 20 kHz. The boosting ratio depends on the winding ratio of primary winding and secondary winding of the step-up transformer 5, and, for example, a DC voltage of 24 V is converted into an approximate rectangular wave voltage of 6 kVp-p. At this time, the output voltage of the step-up transformer 5 may not be always an ideal rectangular wave, but includes certain ringing as shown in FIGS. 3A to 3C. The expression of "6 kVp-p" denotes a peak-to-peak value including ringing. One end of the secondary winding of the step-up transformer 5 is electrically connected to the internal electrode 17 of the dielectric barrier discharge lamp 1, while the other end is connected to the external electrode 18 and is electrically connected to the grounding potential (GND).

The lighting lamp number detecting circuit 6 detects the number of normally lighting dielectric barrier discharge lamps by utilizing the principle shown in FIG. 1, and outputs a stop signal to the drive circuit 7 when the detected number becomes smaller than a specified value. The lighting lamp number detecting circuit 6 includes a control circuit 10, resistors 11, 14 and 15, a capacitor 12, and a diode 13.

A signal proportional to the output voltage of the step-up transformer 5 is detected by using the resistors 14 and 15 connected between the high voltage side of the step-up transformer 5 and the GND. A signal proportional to the first peak value Vp right after polarity change of the high voltage approximate rectangular wave voltage output from the step-up transformer is detected by using a series circuit of the capacitor 12 and the diode 13 connected between the connection point of resistors 14 and 15 and the GND. The resistor 11 connected in parallel to the capacitor 12 is a resistor for setting the holding time of the detected signal proportional to the first peak value after polarity change of the high voltage approximate rectangular wave voltage.

The control circuit 10 is achieved by a commercial microcomputer and the like. The control circuit 10 receives the detected signal proportional to the first peak value after polarity change of the high voltage approximate rectangular wave voltage, and processes the signal digitally through an A/D converter circuit built in the control circuit 10. The control circuit 10 judges the number of twenty-four dielectric barrier discharge lamps 1 which are normally lighting on the basis of the relation shown in FIG. 1. When judging that a specified number of lamps, for example, three lamps are not lighting normally, the control circuit 10 sends a stop signal to the drive circuit 7 for stopping the operation of the ballast circuit.

In this configuration, when a high voltage rectangular wave voltage is applied between the internal electrodes 17 and external electrodes 18 of the twenty-four dielectric barrier discharge lamps 1, a pulse current flows between the internal electrode 17 and external electrode 18 at the time of change of value of the high voltage approximate rectangular wave voltage, that is, at the time of polarity change, resulting in a dielectric barrier discharge in the dielectric barrier discharge lamps 1. At this time, the discharge tube 16, and the gap of discharge tube 16 and external electrode 18 acts as a dielectric. When the dielectric barrier discharge starts, the xenon gas filled in the discharge tube 16 is excited by electrons to emit an ultraviolet ray.

The ultraviolet ray is converted into a visible light by the phosphor 19 applied to the inner wall of the discharge tube 16, and thus the dielectric barrier discharge lamps 1 light. Generally, in the lighting operation using the dielectric barrier discharge, when lighting the lamp using a rectangular wave voltage rather than a sinusoidal wave voltage, the excimer light emission of xenon is increased, resulting in more emitted ultraviolet rays and improved emission efficiency.

Usually, all of twenty-four dielectric barrier discharge lamps 1 are lit normally, but near the end of life, leak or other trouble occurs in the discharge tube 16, and all of dielectric barrier discharge lamps 1 may not be lit normally. The number of dielectric barrier discharge lamps 1 failing to light normally increases (that is, the number of normally lighting dielectric barrier discharge lamps 1 decreases). In this case, as shown in FIG. 1, the value of the first peak A right after polarity change of the high voltage approximate rectangular wave voltage produced from the step-up transformer 5 goes up.

The lighting lamp number detecting circuit 6 detects the change of the value of the first peak A right after polarity change of the high voltage approximate rectangular wave voltage. If it is judged, for example, that three dielectric barrier discharge lamps 1 are not lit normally (that is, twenty-one dielectric barrier discharge lamps 1 are lit normally), a stop signal for stopping the operation of the ballast circuit 2 is sent to the drive circuit 7. When receiving the stop signal, the drive circuit 7 stops output of a gate signal to FETs 8 and 9 to stop the operation of the ballast circuit 2. The threshold of number of unlit lamps in twenty-four dielectric barrier discharge lamps 1 to stop the ballast circuit 2 may be freely changed by changing the program of the microcomputer of the control circuit 10.

In this configuration, the lighting lamp number detecting circuit 6 can detect the number of normally lighting dielectric barrier discharge lamps 1, and thus can stop the operation of the ballast circuit securely when a specified number of dielectric barrier discharge lamps 1 fail to light normally. In the embodiment, the specified number of unlit lamps of dielectric barrier discharge lamps 1 is detected on the basis of the value of the first peak A right after polarity change of the high voltage approximate rectangular wave voltage. Thus, it is not required to provide each lamp with a sensor for detecting defective lamp unlike patent document 2. Hence, as compared with patent document 2, lamp lighting abnormality can be detected securely with a simple structure and a low cost, and the operation of the ballast circuit can be stopped securely.

Embodiment 2

Figure 6:
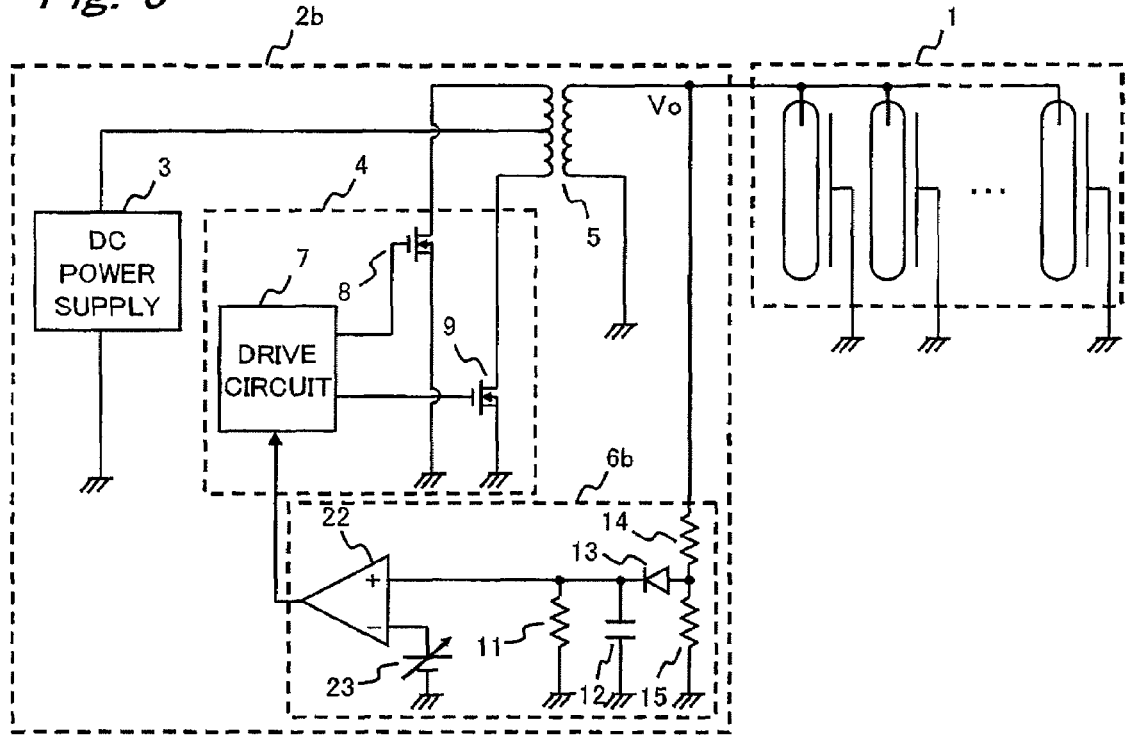
FIG. 6 is a diagram of configuration of a dielectric barrier discharge lamp lighting apparatus according to embodiment 2 of the invention.

FIG. 6 is a diagram of configuration of a dielectric barrier discharge lamp lighting apparatus according to embodiment 2 of the invention. In embodiment 2, what is different from embodiment 1 lies only in the configuration of a ballast circuit 2b, and others are same as in embodiment 1, and same elements are identified with the same reference numerals, and detailed description thereof is omitted.

The lighting lamp number detecting circuit 6b of the embodiment includes a comparator 22 and a reference power supply 23 instead of the complicated control circuit 10 including a microcomputer.

The lighting lamp number detecting circuit 6b detects the first peak value right after polarity change of the high voltage approximate rectangular wave voltage provided from the step-up transformer 5 using resistors 11, 14 and 15, a capacitor 12 and a diode 13, and compares the signal proportional to the first peak value right after polarity change of the high voltage approximate rectangular wave voltage with the voltage of the reference power supply 23 by the comparator 22. If the signal proportional to the first peak value right after polarity change of the high voltage approximate rectangular wave voltage is higher than the voltage of the reference power supply 23, the comparator 22 judges that more than a specified number or more of lamps in twenty-four dielectric barrier discharge lamps 1 fail to light normally, and sends a stop signal for stopping the operation of the ballast circuit 2b to the drive circuit 7. The threshold of number of unlit lamps in twenty-four dielectric barrier discharge lamps 1 to stop the ballast circuit 2b may be freely changed by changing the output voltage of the reference power supply 23.

In this configuration, the configuration of lighting lamp number detecting circuit 6b can be simplified as compared with the lighting lamp number detecting circuit 6 in embodiment 1, and hence a lower cost of the ballast circuit 2b may be expected.

Embodiment 3

Figure 7:
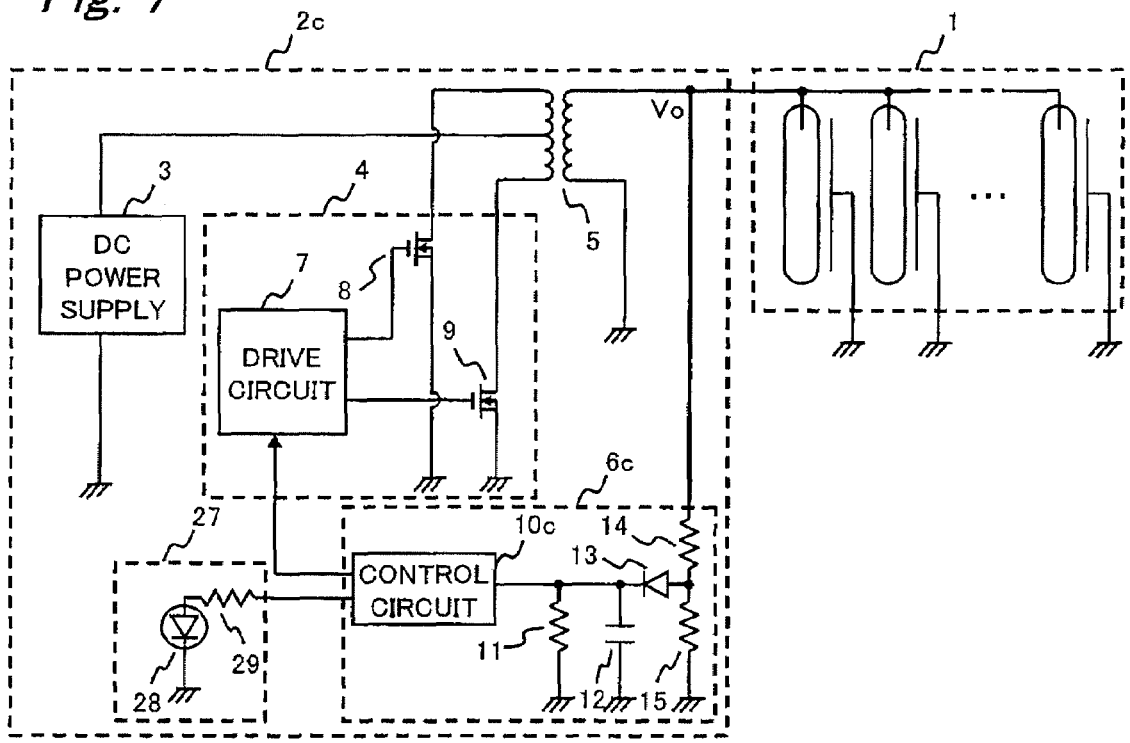
FIG. 7 is a diagram of configuration of a dielectric barrier discharge lamp lighting apparatus according to embodiment 3 of the invention.
Figure 8A:
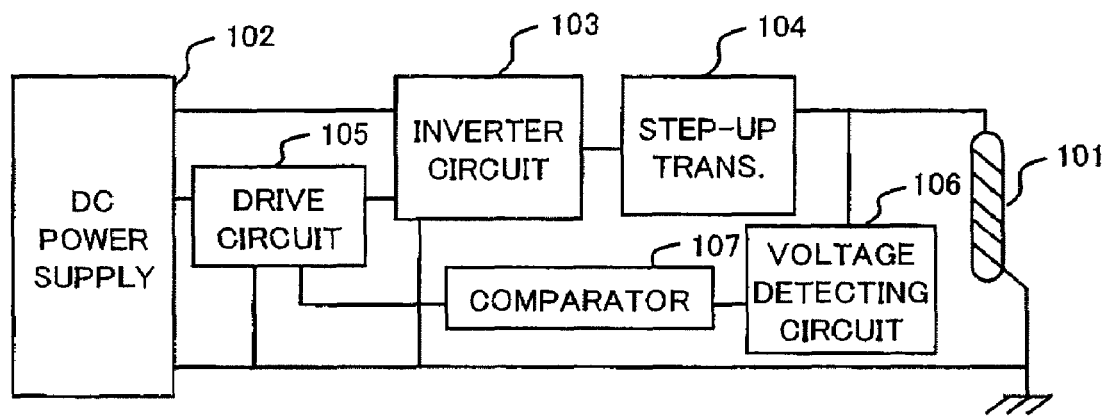
FIG. 8A is a diagram of configuration of a conventional dielectric barrier discharge lamp lighting apparatus.
Figure 8B:
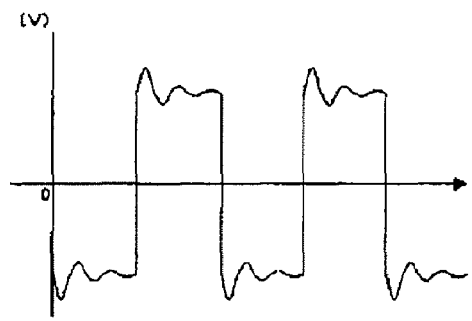
FIG. 8B is a diagram showing an example waveform of an applied lamp voltage in normal state of the dielectric barrier discharge lamp.
Figure 8C:
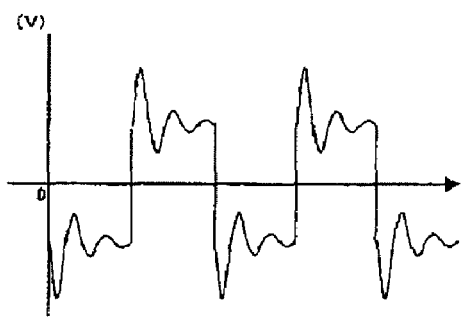
FIG. 8C is a diagram showing an example waveform of an applied lamp voltage in defective state of the dielectric barrier discharge lamp.

FIG. 7 is a block diagram of configuration of a dielectric barrier discharge lamp lighting apparatus according to embodiment 3 of the invention. In embodiment 3, what is different from embodiment 1 lies in that the ballast circuit 2c has a display unit 27, and that the control circuit 10c of the lighting lamp number detecting circuit 6c has a terminal for controlling the display unit 27. Others are same as in embodiment 1, and the same elements are identified with the same reference numerals, and detailed description thereof is omitted. The display unit 27 is composed of LED 28 and resistor 29 for controlling the current flowing in the LED 28.

When the control circuit 10c judges that at least one of twenty-four dielectric barrier discharge lamps 1 fails to light normally, it outputs a signal to the display unit 27 to light up the LED 28. Further, if judging that at least three lamps out of twenty-four dielectric barrier discharge lamps 1 do not light, the control circuit 10c sends a stop signal to the drive circuit 7 to stop the operation of the ballast circuit 2c.

In the case of lighting a plurality of dielectric barrier discharge lamps 1 in parallel, even if several lamps do not light normally, they are deemed to serve as a light source well. Accordingly, it is considered beneficial for the user not to stop the operation of the ballast circuit 2c immediately, but first to inform the user that several lamps of the dielectric barrier discharge lamps 1 are not lit normally by the display unit 27, and stop the operation of the ballast circuit 2c when the number of unlit lamps increases to exceed a specified number.

In this configuration, if any one of dielectric barrier discharge lamps 1 fails to light normally, the fact is shown in the display unit 27, and when a specified number of lamps fail to light normally, the operation of the ballast circuit can be stopped securely.

In the foregoing embodiments, the dielectric barrier discharge lamp 1 is composed as shown in FIG. 5, but it is not limited to this structure. For example, two or more internal electrodes 17 may be disposed, or two or more external electrodes 18 may be used. The discharge tube 16 is made of a borosilicate glass, but it may be made of other materials such as soda glass or quartz glass. The internal electrode 17 is made of nickel, but it may be also made of niobium or other electrode material. The external electrode 18 is made of aluminum, but it may be also made of copper or other metal. The distance between the discharge tube 16 and the external electrode 18 is 3 mm, but the external electrode 18 may contact with the discharge tube 16, and the distance may be within 20 mm. The external electrode 18 may be spirally wound around the discharge tube 16, and is not particularly specified in shape. The internal electrode 17 is formed like a cup, but it may be also formed like a bar. The sealing gas pressure of the discharge gas is 20 kPa, but may be allowed within 5 to 35 kPa approximately. This is an example of lighting a total of twenty-four dielectric barrier discharge lamps 1, but the number of lamps is not particularly specified. For example, the dielectric barrier discharge lamp lighting apparatus of the invention is applied to a 32-inch liquid crystal display, the number of dielectric barrier discharge lamps 1 is about 16 to 20. The operation of the ballast circuits 2, 2b or 2c is stopped when three dielectric barrier discharge lamps fail to light normally, but the number of unlit lamps to stop the operation is not particularly specified.

The ballast circuits 2, 2b, and 2c are of push-pull type, but may be formed in other structures, such as half bridge type or full bridge type. The DC power supply 3 can be easily realized with battery, chopper circuit or so. FETs 8 and 9 may be replaced by bipolar transistors, IGBT, and others. The driving frequency is 20 kHz, but not limited to this frequency, it may be between 5 and 30 kHz from the viewpoint of light emission efficiency. The output voltage of the step-up transformer 5 is 6 kVp-p, but it may vary with design factors such as length of dielectric barrier discharge lamp 1, sealing gas pressure, and others, and may be changed depending on the dielectric barrier discharge lamps.

The lighting lamp number detecting circuit 6, 6b or 6c is not limited to the illustrated examples alone, as far as it is designed to detect the first peak value right after polarity change of the high voltage approximate rectangular wave voltage provided from the step-up transformer 5, and to output a stop signal for stopping the operation of the ballast circuit 2, 2b or 2c depending on the detected value.

As the first peak value right after polarity change of the high voltage approximate rectangular wave voltage, the first peak value of positive polarity is detected, but the first peak value of negative polarity may be detected.

The control circuit 10 may detect the first peak value right after polarity change of the high voltage approximate rectangular wave voltage by obtaining on/off timing information of FETs 8 and 9 from the drive circuit 8 and sampling the output of the step-up transformer 5 at specified timing.

The operation of the ballast circuit 2, 2b, or 2c is stopped by stopping the gate signal from the drive circuit 7, but the way for stopping the operation is not particularly specified. Any way can be used as far as it can stop the operation of the ballast circuit 2, 2b, or 2c, for example, a switch element for cutting off the voltage from the direct-current power supply 3.

The display unit 27 indicates the presence of unlit dielectric barrier discharge lamps by the LED 28, but other display means may be also used. When the dielectric barrier discharge lamp lighting apparatus of the invention is used in the liquid crystal display device, the presence of unlit dielectric barrier discharge lamps may be displayed on a screen of the liquid crystal display.

INDUSTRIAL APPLICABILITY

According to the present invention, the dielectric barrier discharge lamp lighting apparatus for lighting a plurality of dielectric barrier discharge lamps in parallel with one circuit has a lighting lamp number detecting circuit for detecting the number of normally lit dielectric barrier discharge lamps. Thus, when the number of unlit dielectric barrier discharge lamps reaches a specified number, operation of the ballast circuit can be stopped securely. Therefore, the dielectric barrier discharge lamp lighting apparatus of the invention is useful as backlight source for liquid crystal display, light source for copier and scanner, and ultraviolet light source for sterilization or UV cleaning.

The invention claimed is:

1. A dielectric barrier discharge lamp lighting apparatus comprising:
   a plurality of dielectric barrier discharge lamps filled with rare gas in a discharge tube and having at least one external electrode;
   a ballast circuit for applying an approximate rectangular wave voltage of high voltage to the plurality of dielectric barrier discharge lamps in parallel; and
   a lighting lamp number detecting circuit for detecting the number of normally lighting dielectric barrier discharge lamps on the basis of a first peak appearing right after polarity change of the approximate rectangular wave voltage,
   wherein the ballast circuit stops its operation when the number of normally lighting dielectric barrier discharge lamps detected by the lighting lamp number detecting circuit becomes less than a specified number.

2. The dielectric barrier discharge lamp lighting apparatus according to claim 1, further comprising a display unit for displaying warning when at least one of the plurality of dielectric barrier discharge lamps fails to light.

3. The dielectric barrier discharge lamp lighting apparatus according to claim 1, wherein the rare gas includes xenon.

4. A method of detecting the number of normally lighting dielectric barrier discharge lamps in a lighting apparatus for lighting a plurality of dielectric barrier discharge lamps by applying an approximate rectangular wave voltage, the dielectric barrier discharge lamp being filled with rare gas in a discharge tube and having at least one external electrode, the method comprising:
   detecting an amplitude value of a first peak appearing right after polarity change of an approximate rectangular wave; and
   detecting the number of normally lighting dielectric barrier discharge lamps on the basis of the detected amplitude value of the first peak.

5. The dielectric barrier discharge lamp lighting apparatus according to claim 2, wherein the rare gas includes xenon.

* * * * *